United States Patent

Hawkins et al.

[11] Patent Number: 5,991,931
[45] Date of Patent: Nov. 30, 1999

[54] WASTE SYSTEM FOR TOILETS

[76] Inventors: Robert D. Hawkins; James A. Hawkins, both of Atlanta, Trentlock, Nottingham NG10 2FY, United Kingdom

[21] Appl. No.: 09/000,017
[22] PCT Filed: Jul. 26, 1996
[86] PCT No.: PCT/US96/12308
   § 371 Date: Jan. 20, 1998
   § 102(e) Date: Jan. 20, 1998
[87] PCT Pub. No.: WO97/05815
   PCT Pub. Date: Feb. 20, 1997

[30] Foreign Application Priority Data

Aug. 4, 1995 [GB] United Kingdom .................. 9515997

[51] Int. Cl.⁶ .................................................. A47K 11/02
[52] U.S. Cl. ............................................... 4/111.4; 4/449
[58] Field of Search ................................... 4/111.4, 111.6, 4/321, 318, 111.5, 322, 449, 111.1

[56] References Cited

U.S. PATENT DOCUMENTS

| 3,816,857 | 6/1974 | West, Jr. ................................ | 4/111.4 |
| 3,817,193 | 6/1974 | Frankel et al. ........................ | 4/111.4 |
| 4,138,331 | 2/1979 | Frankel et al. ........................ | 4/111.4 |
| 4,148,103 | 4/1979 | Nishioka ................................ | 4/111.4 |

*Primary Examiner*—David J. Walczak

[57] ABSTRACT

A process and apparatus to implement the process for the disposal of toilet waste in a relatively small space with low input energy. The process to include the following operations: separating the liquid portion from the solid portion of the toilet waste, disposing of the liquid portion of the waste by drainage, forming a mixture by combining the solid portion of the waste with a quantity of flammable material having structural properties that retain air passages within the mixture, storing the mixture in a chamber, and burning the mixture within the chamber.

6 Claims, 4 Drawing Sheets

WASTE SYSTEM FOR TOILETS

TECHNICAL FIELD

This invention relates to an improved method of waste disposal to be used with toilets that cannot be connected to sewer drains and particularly to be used with dry toilets with disposable bowl lining material.

BACKGROUND

Worldwide water shortages and the expense of cleaning up polluted water has resulted in an increasing need to dispose of toilet waste without the use of water or centralised sewage processing.

Toilets which do not use water and which do not depend on central sewage processing fall into four types— incinerating toilets, sterling toilets, composting toilets and lined toilets. Incinerating toilets use an external source of energy to heat the waste, evaporate all the liquid waste and burn the remaining solid waste. Disadvantages are the high initial cost, the high operating cost and the use restriction imposed by the incinerating cycles. Similarly, sterilizing toilets use external energy to evaporate urine and heat the feces to kill the bacteria but require the inconvenience of frequent manual clean out for disposal elsewhere. Composting toilets store the waste in an aerated chamber and use aerobic bacteria to digest or oxidise the waste over a long time period. Composting toilets are bulky and relatively expensive installations which need frequent manual attention. Lined toilets surround the waste in plastic and transport it to a storage container for eventual manual removal and separate disposal elsewhere.

None of the foregoing waterless toilets perform their function as conveniently and with as little user attention as a conventional water flushing toilet. However, the water flushing toilet does not have to actually dispose of the waste. It uses clean water to move the waste to a remote location where more expensive disposal processes are undertaken. In many parts of the world this is no longer an economically viable procedure.

Most toilets which combine solid and liquid waste together cannot take advantage of the fact that liquid toilet waste containing urine and any flushing water is much easier to dispose of than solid toilet waste containing feces, paper, diapers, fibrous sanitary items and potentially harmful pathogens. Urine which is normally sterile and constitutes the bulk of human waste is readily absorbed into soil or dispersed in waterways without environmental harm whereas solid toilet waste requires special treatment before it can be released into the environment.

To eliminate a health hazard it would be better to incinerate the solid toilet waste but the high water content and the low heating value of the waste makes this expensive and complicated.

DISCLOSURE OF INVENTION

The cost and inconvenience of disposing of toilet waste at the toilet site can be greatly improved by the present invention which is applicable to dry toilets, particularly dry toilets using disposable bowl lining sheet, and which provides means by which all the solid toilet waste can be incinerated economically with minimal use of external energy.

The present invention is a process which includes the following operations:

1) Separating the liquid portion of the toilet waste from the solid portion of the toilet waste,
2) Disposing of the liquid portion of the waste by drainage,
3) Forming a mixture by combining the solid portion with a quantity of flammable material with structural properties that retain air passages within the mixture,
4) Storing the mixture in a chamber, and
5) Burning the mixture within the chamber.

This process can eliminate or substantially reduces the amount of external energy that would normally be required to incinerate toilet waste and can be implemented by apparatus of relatively small proportions which would be suitable for installation in residential premises.

Although it is technically feasible to apply this process to a conventional incinerating toilet, an example of which is disclosed by Frankel et al. in U.S. Pat. No. 4,138,331, extensive modification would be required to drain the liquid waste, to provide a supply of flammable aerating material (eg. plastic shapes), to mix the flammable aerating material with the solid waste and to store the mixture in a separate chamber. The amount of fuel saved might not justify the extra cost of the apparatus and the added flammable material.

The process becomes more commercially viable when applied to a dry flushing toilet employing bowl lining material such as is described in International Publication Number WO95/24853. This type of toilet has a bowl lined with thin sheet material which is renewed each time the toilet is used. The sheet material could be polyethylene which burns easily and has a heat value of 46,500 kilojoules per kilogram. This value is greater than coal or fuel oil and is three times higher than dry feces or paper. The referenced toilet is described as having bowl with a sloped bottom surface to assist the separation of liquid waste from the solid waste within the bowl lining sheet. The bowl lining sheet is shown as a substantially continuous rectangular sheet which is unsealed at the exit aperture on the side of the bowl and would, unless otherwise obstructed, allow the liquid portion of the waste to flow out of the bowl.

To further implement the operation to separate the liquid waste a drainage channel is provided which leads to a lower chamber adapted to receive and to dispose of the liquid waste and having an entrance way with a screen or particle filter through which the solid waste cannot pass. To implement an operation to form a burnable mixture composed of flammable liner sheet and solid toilet waste a pump housing is provided to receive the soiled liner sheet and any solid toilet waste as they are removed or flushed from the bowl by the dry toilet's liner sheet conveyance mechanism. The pump housing is equipped with a piston with a cutter which when advanced through the pump housing crumples and cuts the liner sheet to form a wad. This action spreads the solid waste against the surface of the sheet while at the same time making air passages between the folds of the sheet which assist the further drying and subsequent burning of the mixture. The motion of the piston also pushes the wad into a waste pipe leading to a solid waste storage chamber.

Subsequent flushing cycles result in the accumulation of wads within the storage chamber. To assist the further drying and the successive burning of the waste provision can be made for the storage chamber walls to be ventilated and to be surrounded by a duct connected to a chimney through which drying air can flow to the outside atmosphere. The accumulated waste in the ventilated storage chamber gets drier as time progresses thus further improving combustion efficiency. Burning of the waste mixture within the storage chamber can be initiated by electric or gas igniters. Ordinarily the polyethylene content would provide the higher heat value necessary to sustain combustion in the presence of moist solid waste, however, in cold damp conditions a supplemental heat source could ensure more complete combustion. Alternatively, the storage chamber could be manufactured from a disposable and burnable material with provision for detaching from the inlet duct for incineration at a remote facility.

It is normal for moist toilet waste to biologically decompose. In the absence of air anaerobic bacteria will release unpleasantly smelling gases that will be undesirable even if vented to the outside atmosphere. However, the air passages created by the crumpled liner material or any other aerating additive would encourage digestion by aerobic bacteria the products of which are not objectionable. As drying decreases the moisture content, the biological activity will also decrease.

The liquid waste that drains into the lower chamber is mostly urine which is normally a sterile liquid containing harmless compounds and salts but it could be contaminated by bacteria from the feces. Urine would normally be discharged without treatment into a sewer drain or dry well but if the circumstances require it could be sterilized by chemicals or by ultra violet radiation before discharge.

Without a connection to an outside vent or a liquid drain it is not practical for portable toilets to dispose of the waste in situ. Nevertheless, the essential processes of this invention, i.e. separation of liquid and solid waste, adding aerating material, draining and drying, can be accomplished but only over a shorter period due to limited storage space. The resulting waste would have a relatively higher moisture content but would with the added heat value still incinerate well in the presence of other combustibles. Furthermore, the waste holding unit could be made of polyethylene which would be disposed of or burned along with the contained solid waste thus minimising unpleasant handling. The liquid would be drained from its portion of the disposable waste holding unit before incineration.

A preferred form of apparatus to implement the waste disposal process of this invention would comprise: a dry flushing toilet which uses bowl lining sheet material to contain the toilet waste and to convey the waste out of the bowl, the sheet material being combustible and of relatively high heat value, an opening in the sheet material through which liquid waste can drain while the solid waste is retained, a pump housing adapted to receive the soiled bowl liner sheet together with any solid toilet waste when they are conveyed out of the bowl, a piston within the pump housing equipped with a cutting device which when advanced crumples and cuts the soiled liner sheet to form a wad with air passages between the folds of the liner sheet, an upper chamber for the storage of the soiled liner sheet and the solid waste, a pipe connecting to the pump housing through which the wads produced by the piston can be transported for storage in the upper chamber, the upper chamber having means for the passage of air through the chamber, a lower chamber adapted to receive the liquid waste that has drained out of the liner sheet, the lower chamber having means for draining the liquid waste, a particle filter interposed between the internal volume of the upper chamber and the internal volume of the lower chamber, the filter being dimensioned to allow the passage of the liquid waste into the lower chamber and to contain the solid waste in the upper chamber, and a means for igniting and burning the waste within the upper chamber.

In another preferred form of apparatus to implement this waste disposal process, the upper and lower chambers, the particle filter and the connection to the toilet pump housing can be fabricated in one piece from a thin, flexible and combustible material which when manufactured will lie flat but when in use will expand to contain the incoming toilet waste. This disposable waste holding unit can also be provided with a lowermost spout with an openable seal to assist the removal of the liquid waste before incineration, an upper vent with an integral chemical filter to prevent the escape of odorous chemicals while allowing the ingress of air and a soluble chemical biocide packaged into the lower liquid portion to maintain sterile conditions.

BRIEF DESCRIPTION OF DRAWINGS

This invention will be further described by way of example only, by reference to the accompanying and purely diagrammatic drawings, in which.

BEST MODE FOR CARRYING OUT INVENTION

Figure 1:
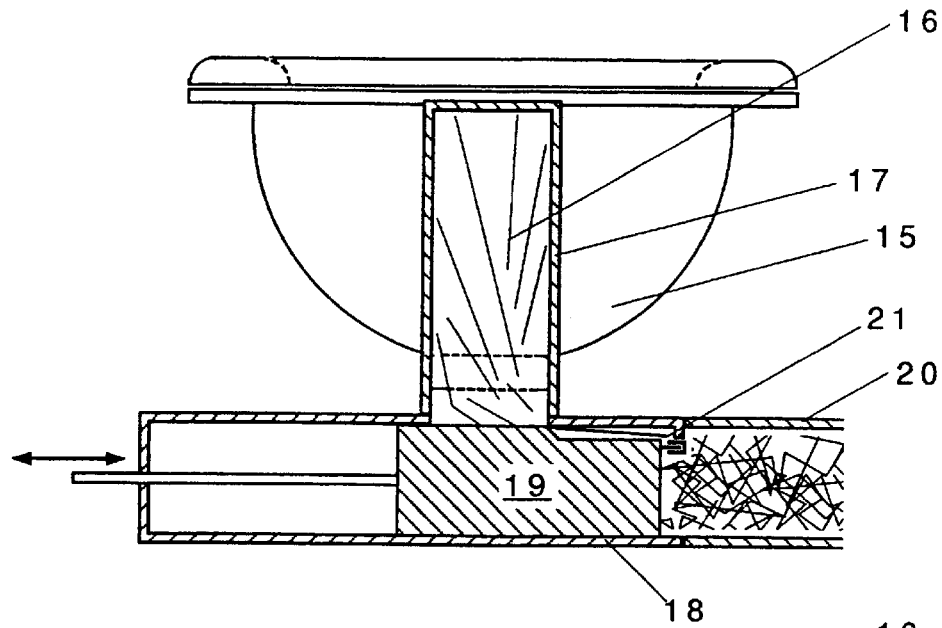
FIG. 1 is a side view of a lined, dry toilet exposing a section through the waste pump with the piston in the closed position.
Figure 2:
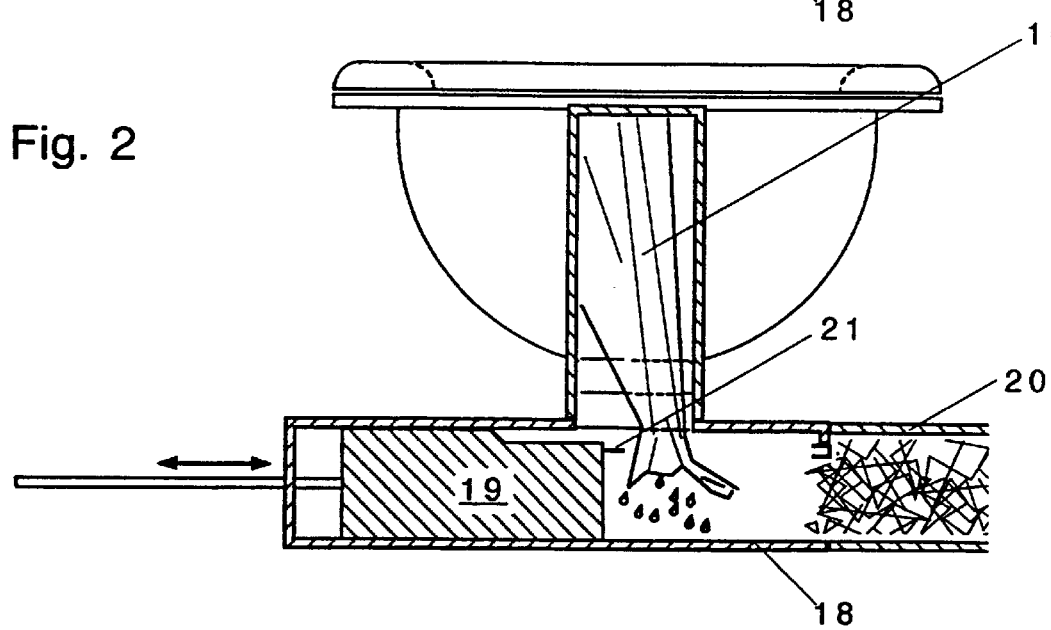
FIG. 2 is as FIG. 1 but with the piston partly retracted.
Figure 3:
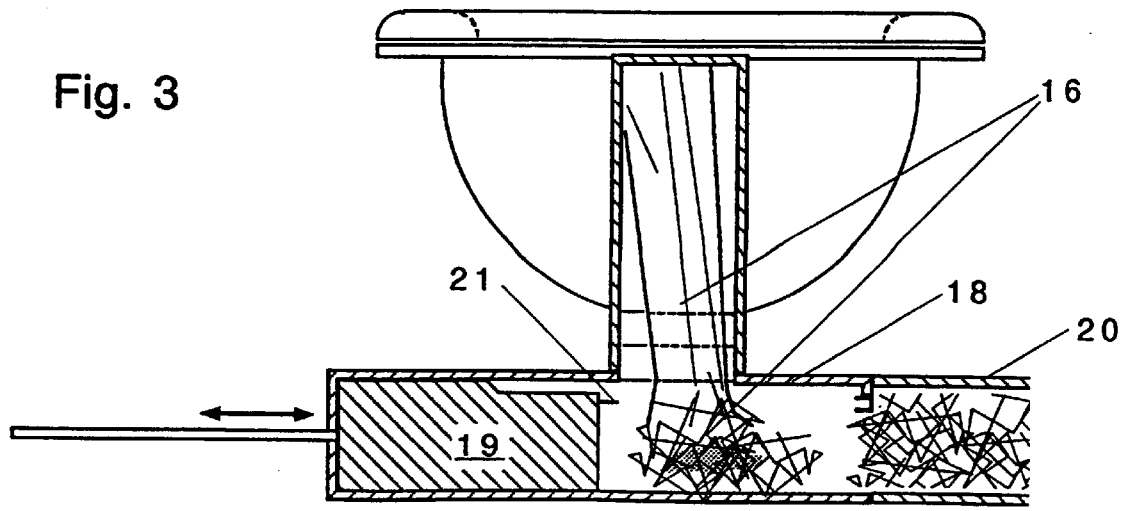
FIG. 3 is as FIG. 1 but with the piston fully retracted.

A lined toilet shown in FIG. 1 has a bowl 15 which is lined with flammable plastic sheet 16 which is shown emerging from the bowl's exit aperture 17 and entering into a pump housing 18 where the end of the plastic sheet 16 is pinched closed by the pressure of a piston 19 against an opposing surface on the pump housing 18. When the toilet is used a slope at the bottom of the bowl 15 and a slope at bottom of the exit aperture 17 cause liquid waste to drain down and accumulate in the plastic sheet 16 near the piston 19 whereas solid waste which does not flow readily is retained in another part of the plastic sheet 16 in the center of the bowl 15. In FIG. 2 the flushing cycle has started and the piston 19 has partly retracted thus releasing the pinched end of the plastic sheet 16 and allowing any accumulated liquid waste to drain into the bottom of the pump housing 18 where the it can flow along the bottom of a waste pipe 20. FIG. 3 shows the piston 19 fully retracted thus leaving the pump housing 18 open to receive the soiled plastic sheet 16 containing any solid toilet waste that may have been deposited in the bowl 15 but without the liquid waste which has already drained from within the plastic sheet 16. To complete the flushing cycle the piston 19 is advanced to close the open pump housing 18 and force the soiled plastic sheet 16 containing the solid waste into the drain pipe 20 and simultaneously forcing the waste from previous flushing cycles further along the waste pipe 20. As the piston 19 reaches the end of its advance a clean portion of the plastic sheet 16 is again pinched closed and simultaneously a cutter 21 at the end of the piston severs the soiled portion of the plastic sheet 16 from the clean portion which makes a new opening through which liquid waste can drain during the next flushing cycle. The force of the piston 19 acting on the soiled liner sheet 16 which has been deposited in the pump housing 18 spreads any solid waste contained therein against the surface of the sheet 16 and simultaneously folds and crumples the sheet 16, thus creating air passages between the folds to facilitate the subsequent drying and burning of the mixture.

Figure 4:
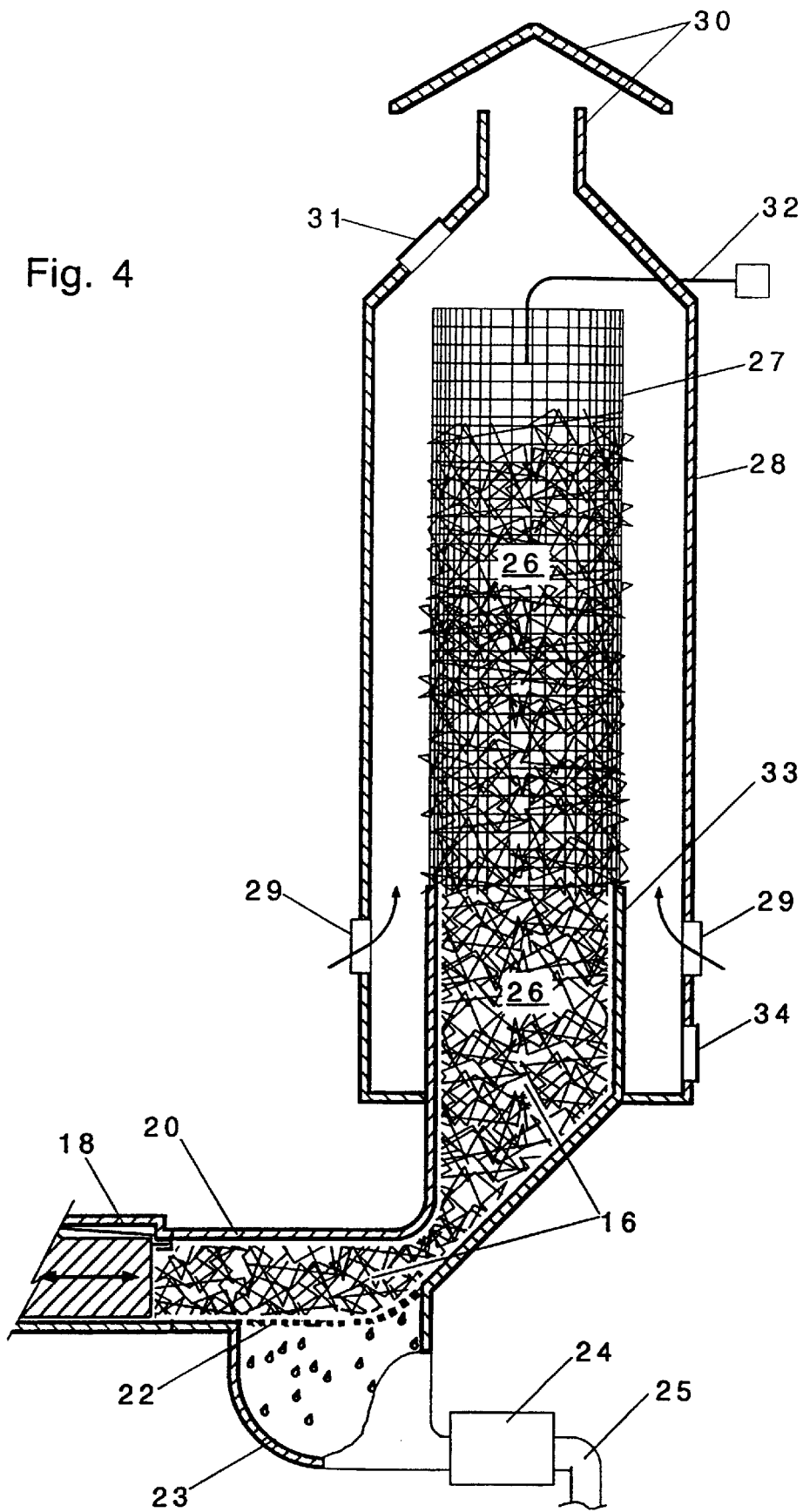
FIG. 4 is section view of the side of the waste holding incinerator chamber.

Now referring to FIG. 4 the waste pipe 20 extends from the end of the pump housing 18 over a particle filter 22 through which the liquid waste drains into a lower chamber 23 and from there through an optional sterilizing device 24 before entering the discharge pipe 25. The plastic sheet 16 containing the solid waste is progressively pushed along the drain pipe 20 which bends upward into a solid waste storage chamber 26. The upper portion of the chamber walls 27 are made of metal mesh which exposes the waste sheet material 16 to the air within a duct 28 which surrounds the solid waste chamber 26. Air enters the duct 28 through lower ports 29 and passes out the top through a chimney 30 to the outside atmosphere. The waste material within the chamber 26 gets progressively drier the longer it is stored. When dry enough to support combustion the waste sheet material 16 can be ignited manually through a port 31 in the duct or it could be ignited automatically by an igniter device 32 triggered by a sensor. The waste sheet material 16 together with the solid waste will burn within the storage chamber 26 until extinguished by excessive moisture content or until air is excluded by the air tight walls 33 on the lower portion of the container 26. Combustion gases pass up through the chimney 30 and any residual ash which falls out through the container walls 27 can collect on the bottom of the duct 28 and be removed through a clean-out door 34.

Figure 5:
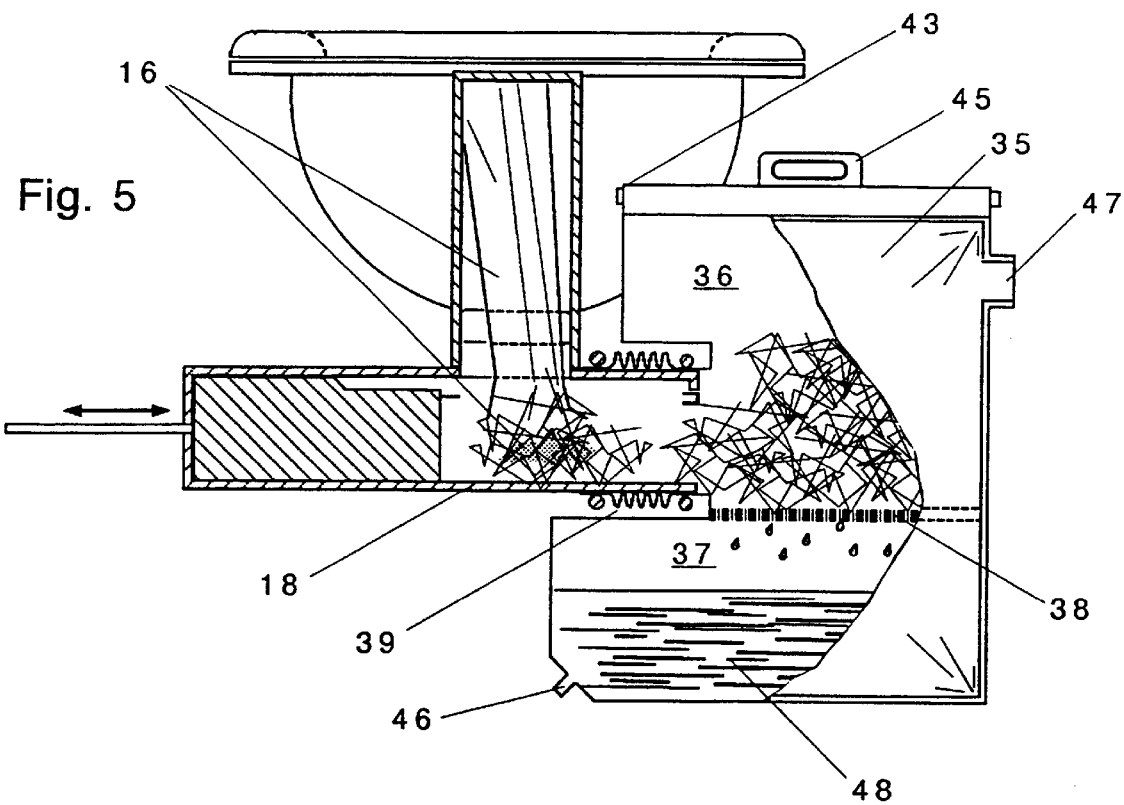
FIG. 5 is a side view of a lined, dry toilet exposing a section through the waste pump and an attached disposable waste holding unit.
Figure 6:
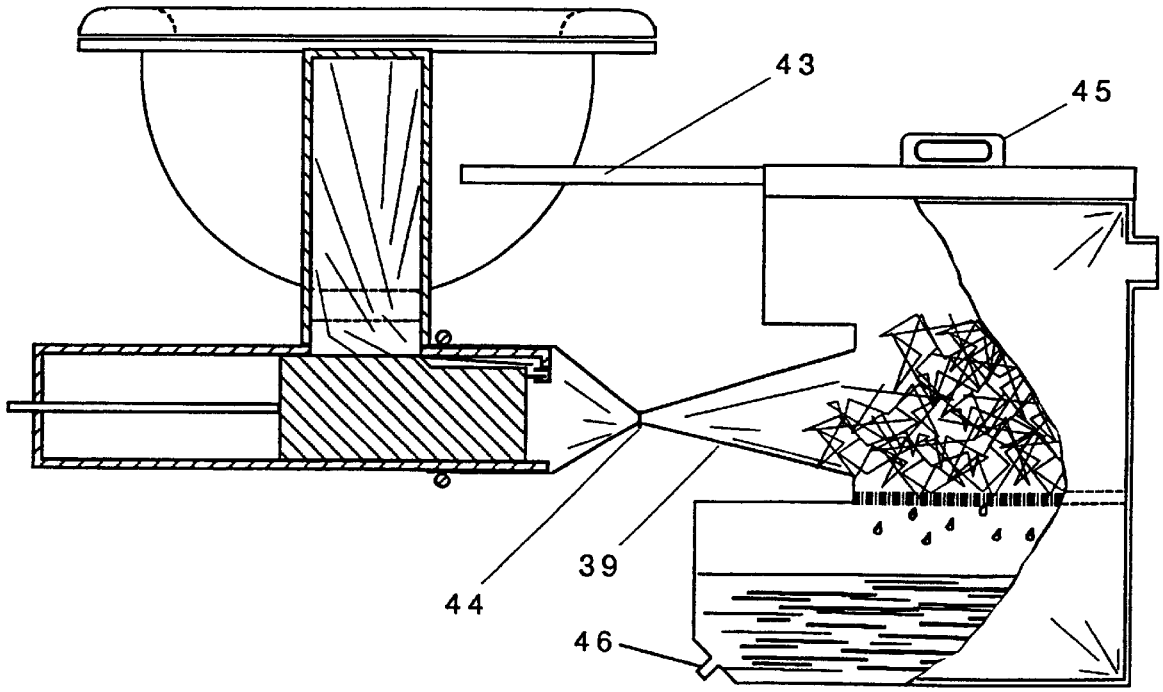
FIG. 6 is as FIG. 5 but showing a method of removing the disposable waste holding unit.

A lined toilet intended for portable use is shown in FIGS. 5 & 6 where the pump housing 18 is connected directly to a disposable waste holding unit 35 which is divided into an upper storage chamber 36 to contain the soiled sheet material 16 together with the solid waste and a lower storage chamber 37 to contain the liquid waste. The upper storage chamber 36 is separated from the lower storage chamber 37 by a particle filter 38 which allows only the essentially liquid waste to pass into the lower storage chamber 37. The disposable waste holding unit 35 is connected to the pump housing 18 by means of an extendable sleeve 39 which is clamped around the outside of the pump housing 18. The weight of the waste holding unit 35 is supported on bracket 43 which could extend as shown in FIG. 6 to facilitate removal of the extendable sleeve 39 from the pump housing 18 by providing room to apply a tie 44 to the sleeve 39 thus sealing the waste holding unit 35 before disconnecting from the pump housing 18.

The handle 45 facilitates the manual lifting of the waste holding unit 35 for disposal elsewhere. Before disposal by incineration the liquid waste can be drained from the lower storage chamber 37 by opening a sealed spout 46. The lower storage chamber 37 can also contain a biocide chemical which will keep the accumulated liquid waste 48 sterile. The upper storage chamber 36 may be provided with an air vent 47 into which is sealed a filter to prevent the escape of smells or contaminated particles. The air vent 47 could assist the disposal of the waste holding unit 35 by allowing its volume to be reduce by squeezing and would also discourage odor producing anaerobic bacteria.

Figure 7:
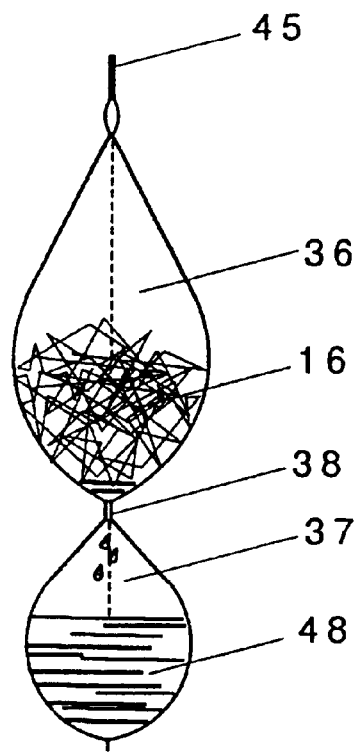
FIG. 7 is an end section view of the disposable waste container holding unit.
Figure 8:
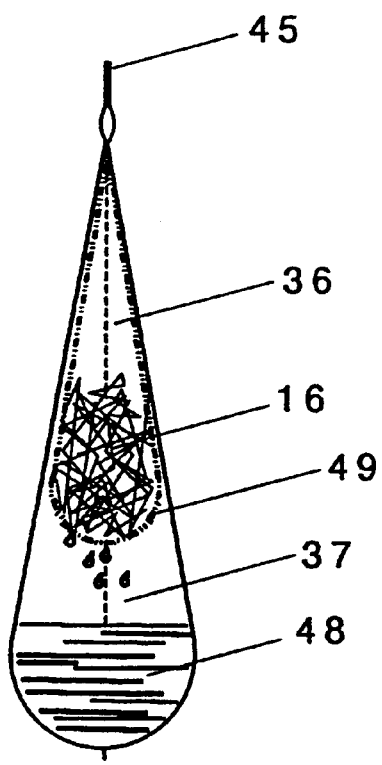
FIG. 8 is an end section view showing a disposable waste holding unit of an alternative type of construction.

The disposable container 35 can be manufactured from flat thermoplastic sheets the seams of which are heat sealed together to form the storage chambers 36 and 37 and the sleeve 39 as well as the small passages that form particle filter 38. The flat plastic will expand in use to contain the waste as shown in cross section in FIG. 7. Alternatively, as shown in FIG. 8, the particle filter 38 could be provided in the form of a textile sheet 49 also heat sealed into the waste holding unit 35. The textile sheet particle filter 49 has more surface area than the thermoformed particle filter 38 and would be less likely to become clogged.

We claim:

1. A process for disposal of toilet waste having a liquid portion and a solid portion, the process to include the following operations: separating the liquid portion from the solid portion of the waste, disposing of the liquid portion of the waste by drainage, forming a mixture by combining the solid portion with a quantity of flammable material with structural properties that retain air passages within the mixture, storing the mixture in a chamber, and burning the mixture within the chamber.

2. A process for disposal of toilet waste according to claim 1 wherein the flammable material is in the form of a sheet material wrapper which partly surrounds the toilet waste, the wrapper having an opening through which the liquid portion of the waste can drain away while the solid portion is retained.

3. Apparatus for disposal of toilet waste to implement the process of claims 1 or 2 comprising; combustible sheet material capable of being formed into a container for holding toilet waste, a storage unit having an upper chamber and a lower chamber divided by a wall, the wall having perforations through which the liquid waste can drain into the lower chamber while the solid waste is retained in the upper chamber, an opening in the upper chamber adapted to receive the toilet waste, transporting means to move the sheet material containing toilet waste through the opening into the upper chamber and means for draining the liquid waste out of the lower chamber.

4. Apparatus for disposal of toilet waste according to claim 3 wherein the storage unit is adapted by means of vents for the combustion of the solid waste within the upper chamber.

5. Apparatus for disposal of toilet waste according to claim 3 wherein the storage unit is formed from combustible material and has means for detaching from the transporting apparatus for disposal by burning.

6. Apparatus for disposal of toilet waste according to claim 3 wherein there is provided a cutter to slit the sheet material to assist the liquid waste to drain out of the the container formed by the sheet material.

* * * * *